United States Patent
Belchine, III et al.

(10) Patent No.: US 7,103,939 B2
(45) Date of Patent: Sep. 12, 2006

(54) PIN-LESS DAMPER ASSEMBLY FOR AN ASSIST GRIP HANDLE

(75) Inventors: Walter Belchine, III, Plainfield, IL (US); Joel R. Lee, Homewood, IL (US)

(73) Assignee: Illinois Tool Works Inc, Glenview, IL (US)

( * ) Notice: Subject to any disclaimer, the term of this patent is extended or adjusted under 35 U.S.C. 154(b) by 0 days.

(21) Appl. No.: 10/912,320

(22) Filed: Aug. 5, 2004

(65) Prior Publication Data

US 2005/0091798 A1    May 5, 2005

Related U.S. Application Data

(60) Provisional application No. 60/516,819, filed on Nov. 3, 2003.

(51) Int. Cl.
*A45C 3/00* (2006.01)
(52) U.S. Cl. ...................................... 16/412
(58) Field of Classification Search ................. 16/429, 16/412, 444, 445, 438, DIG. 24, DIG. 50, 16/DIG. 85, 273, 277, 337; 296/214, 210, 296/39.1; 411/41, 45–48
See application file for complete search history.

(56) References Cited

U.S. PATENT DOCUMENTS

| | | | | |
|---|---|---|---|---|
| 4,981,322 | A * | 1/1991 | Dowd et al. ............... | 296/214 |
| 5,560,575 | A * | 10/1996 | Krysiak ................. | 248/222.12 |
| 5,920,957 | A * | 7/1999 | Wagner .................... | 16/408 |
| 6,048,125 | A * | 4/2000 | Droche et al. .............. | 403/12 |
| 6,176,660 | B1 * | 1/2001 | Lewis et al. ................ | 411/45 |
| 6,223,395 | B1 * | 5/2001 | Miho et al. ................ | 16/429 |
| 6,397,435 | B1 * | 6/2002 | Gosselet .................... | 16/438 |
| 6,428,089 | B1 * | 8/2002 | Noda ........................ | 296/214 |
| 6,467,130 | B1 * | 10/2002 | Kurachi et al. ............. | 16/438 |
| 6,536,080 | B1 * | 3/2003 | Bella et al. ................. | 16/412 |
| 6,616,222 | B1 * | 9/2003 | Ponceau .................... | 296/214 |
| 6,668,424 | B1 * | 12/2003 | Allen et al. ................. | 16/444 |
| 6,708,371 | B1 * | 3/2004 | Belchine, III .............. | 16/386 |
| 6,836,932 | B1 * | 1/2005 | Yamamoto et al. ........ | 16/110.1 |
| 2002/0020250 | A1 * | 2/2002 | Sakuma et al. ............ | 74/551.9 |
| 2003/0074767 | A1 * | 4/2003 | Chang ....................... | 16/438 |

FOREIGN PATENT DOCUMENTS

| | | |
|---|---|---|
| DE | 35 13 293 | 10/1986 |
| DE | 295 20 525 | 2/1996 |
| DE | 296 04 260 | 4/1996 |
| DE | 296 05 343 | 5/1996 |
| DE | 296 12 550 | 12/1996 |
| DE | 297 12 358 | 9/1997 |
| DE | 196 11 309 A1 | 2/1998 |
| DE | 298 08 330 | 6/1998 |

(Continued)

*Primary Examiner*—Robert J. Sandy
*Assistant Examiner*—Andre' L. Jackson
(74) *Attorney, Agent, or Firm*—Mark W. Croll; Paul F. Donovan

(57) ABSTRACT

An assist grip handle assembly that may be snap-fit to the interior of a vehicle or other structure includes a damper assembly provided with the handle assembly that does not require the use of a pivot pin. The damper assembly of the invention easily snap-fits into the assist grip handle assembly and provides improved speed control of the rotational movement of the assist grip handle. With the present invention, no special tools are required to assemble the assist grip handle assembly as the components may be snap-fit together resulting in a less complex and cumbersome assembly.

16 Claims, 9 Drawing Sheets

FOREIGN PATENT DOCUMENTS

| | | |
|---|---|---|
| DE | 201 08 894 | 10/2001 |
| EP | 0 900 691 | 3/1999 |
| EP | 1 125 790 A | 8/2001 |
| EP | 1 179 447 | 2/2002 |
| EP | 1 227 263 A | 7/2002 |
| FR | 2 764 010 | 12/1998 |

* cited by examiner

PIN-LESS DAMPER ASSEMBLY FOR AN ASSIST GRIP HANDLE

CROSS REFERENCE TO RELATED APPLICATION

This Non-Provisional Application claims benefit to U.S. Provisional Application Ser. No. 60/516,819 filed Nov. 3, 2003.

FIELD OF THE INVENTION

The present invention relates generally to an assist grip handle assembly for a vehicle, and more particularly, to an assist grip handle assembly including a pin-less damper assembly for providing improved, controlled movement of the assist grip handle in the vehicle.

BACKGROUND OF THE INVENTION

Assist grip handles are commonly found in vehicles, and specifically automobiles, to enable a user to more easily enter and exit the vehicle. By grabbing onto the assist grip handle, the user will be able to assist himself or herself while entering or exiting the vehicle, or while sitting within the vehicle. In many vehicles, several assist grips are provided. In some known applications, an associated hook is provided on the assist grip handle. The hook is commonly used for hanging clothes and the like in the vehicle.

The assist grip handle is typically a pivotable assembly which pivots from a stowed position to an open position, and likewise from an open position to a stowed position. In the stowed position, the assist grip handle is positioned out of the way of the user. In prior assist grip handle designs, a hinge is typically coupled to the assist grip through the use of a pivot pin to provide the pivoting action of the assist grip handle. However, while such prior designs have proven to be mostly successful, they do have certain drawbacks. As an example, such prior assist grip handle assemblies require numerous components and are cumbersome and complex to assemble on account of the need for a pivot pin. Because of these and other drawbacks with known assist grip handle designs, there is a need in the art for an improved assembly that reduces the cumbersome nature of these assemblies, is easier to manufacture and less complex to assemble, results in less components, and has an overall lower cost application.

The present invention is directed at providing such an improved assembly.

SUMMARY OF THE INVENTION

The present invention is directed to an assist grip handle assembly for use in a vehicle. The assist grip handle assembly includes a damper assembly that does not require the use of a pivot pin. The damper assembly of the invention easily snap-fits into the assist grip handle assembly and provides improved speed control of the pivoting movement of the assist grip handle. With the invention, no special tools are required to install the assist grip handle assembly to a vehicle, or assemble the components of the assist grip handle assembly as the components may be snap-fit together resulting in a less complex and less expensive assembly.

Other features and advantages of the invention will become apparent to those skilled in the art upon review of the following detailed description, claims and drawings in which like numerals are used to designate like features.

Figure 1:
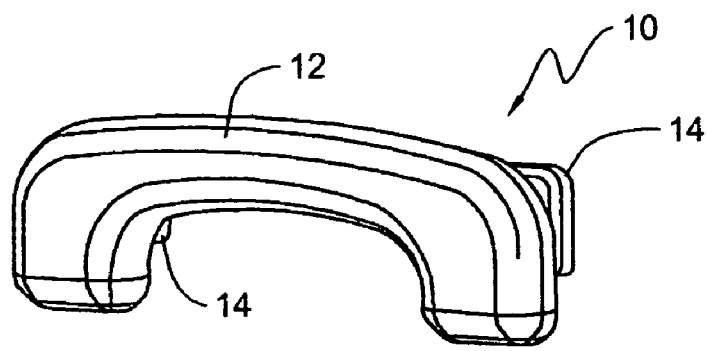
FIG. 1 is an isometric view of the handle assembly of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof

DETAILED DESCRIPTION OF THE EMBODIMENTS

Referring to the figures there is depicted an assist grip handle assembly and an accompanying pin-less damper for the assist grip handle assembly. The present invention may be used in a vehicle to enable a user to more easily enter and exit the vehicle. The invention, however, is not limited to the described application but may have other uses and applications where it is desirable to provide an assist grip handle as an aid for the user. With the present invention, no pivot pins are required and no special tools are needed to assemble the invention as the components and parts of the invention may be snap-fit together, thereby resulting in a less complex and cumbersome assembly.

Figure 2:
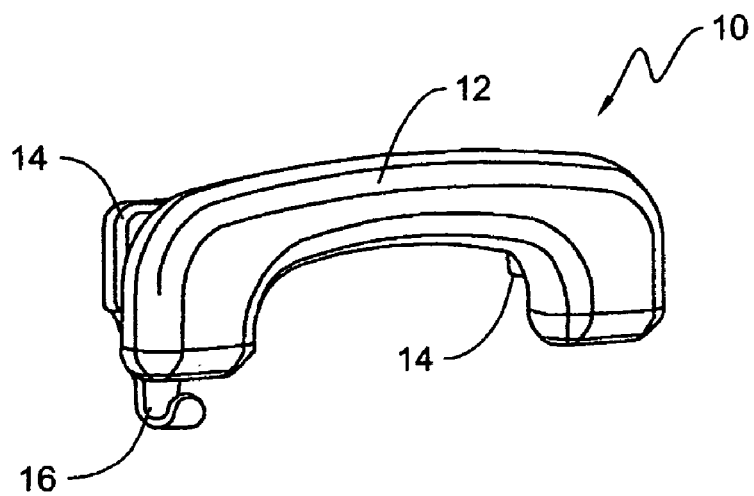
FIG. 2 is another isometric view of the handle assembly of FIG. 1 and incorporating a coat hook.
Figure 3:
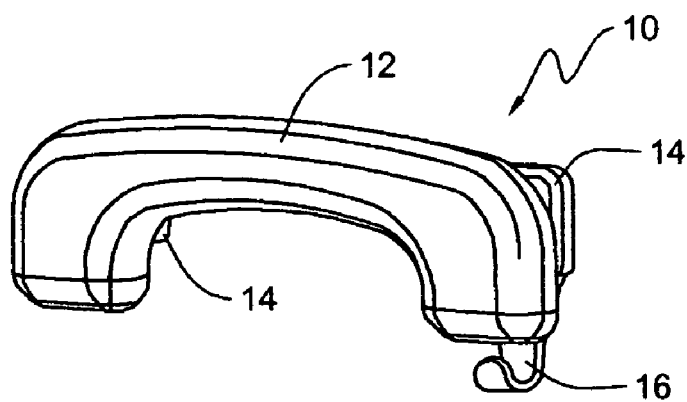
FIG. 3 is an isometric view of another assembly of the invention of FIG. 1 and incorporating a coat hook.

As depicted in FIGS. 1–3, the assist grip handle assembly 10 of the invention includes a handle 12 having a contoured shape similar to known handles used in the interior of a vehicle. The handle serves to assist the user in entering and exiting the vehicle. Each end of the handle is mounted to the interior of the vehicle or other structure through the use of a hinge 14. One hinge 14 is mounted to each end of the handle 12 and the hinges serve to connect the ends of the handle 12 to the vehicle interior or other structure. As described below, the hinges 14 include features that permit the hinges 14 to be snap-fit to the vehicle interior and also to the ends of the handle 12. Depending on the application, a coat hook 16 may be positioned behind one or more of the hinges 14 to serve as a hook for hanging clothing or the like.

Figure 6:
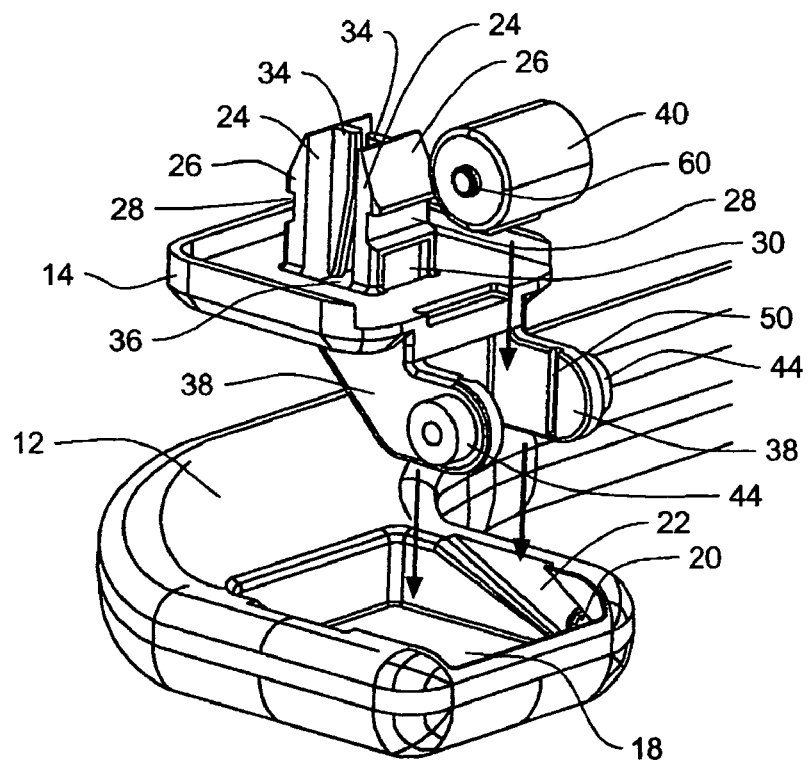
FIG. 6 is an isometric exploded view of an exemplary embodiment of the mounting components of the present invention.
Figure 7:
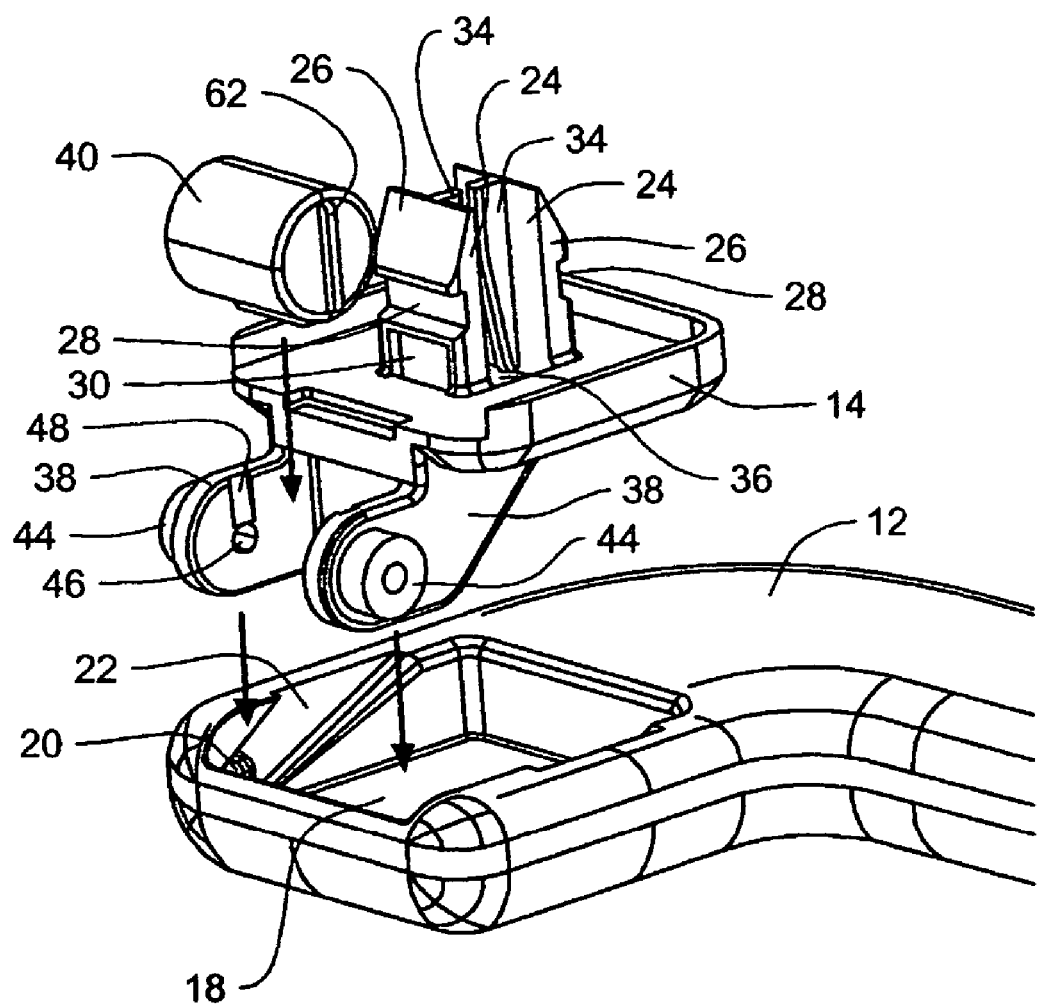
FIG. 7 is another isometric exploded view of the mounting components of FIG. 6.

Referring to FIGS. 6 and 7, there is depicted an assembly of an exemplary embodiment of the mounting components of the present invention. As will be apparent from the figures, the components used to mount the handle 12 to the vehicle interior are easily snap-fit to the handle 12 and to the interior of the vehicle. As depicted, each end of the handle 12 defines an aperture 18 for receiving and housing the components used to mount the handle 12 to the vehicle interior. Located within the aperture 18 and on the inside walls of each of the handle ends are opposing holes 20 that are used to secure the mounting components, and specifically the mounting hinge 14 and damper 40, to the handle 12. Positioned adjacent to the opposing holes 20 within the aperture 18 are lead-ins or tracks 22 for assisting with the mounting of the hinge 14 to the handle 12. The lead-ins or tracks 22 define an angled groove or channel that during the installation of the hinge 14 onto the handle 12 serve to guide the hinge 14 to the opposing holes 20. That is, the hinge 14 will slide along the lead-ins or tracks 22 to the opposing holes 20. During use of the handle 12, the lead-ins or tracks 22 also assist in withstanding the rotational forces exerted on the handle 12.

Each hinge 14 includes outwardly extending, spaced-apart, flexible mounting tabs 24 that are used to secure the hinge 14 to a mating opening, not shown, in the vehicle interior. The tabs 24 permit the hinge 14 to be snap-fit to the mating opening in the vehicle. Each of the tabs 24 defines a tapered end 26 to facilitate the insertion of the tabs 24 into the mating opening. Each of the tabs also defines a notch 28 that forms a mounting surface to assist in holding and securing the tabs 24 within the mating opening. Located below each notch 28 is a recessed portion 30 that is sized and shaped to mate with a tab 32 of the coat hook 16, as described below. The recessed portion 30 will aid in securing the coat hook 16 to the flange 14. An inclined rib 34 is positioned along the back surface of each of the tabs 24 and extends along the length of the tabs 24. Located on the hinge 14 between the tabs 24 is an opening 36 through which is mounted a lock pin 72, as described below, for further securing of the hinge 14 to the vehicle interior. As described below, when the lock pin 72 is inserted through the opening 36, the lock pin 72 will contact the inclined ribs 34 and will force the tabs 24 to spread apart to further secure the hinge 14 to the mating opening in the vehicle interior.

Figure 8:
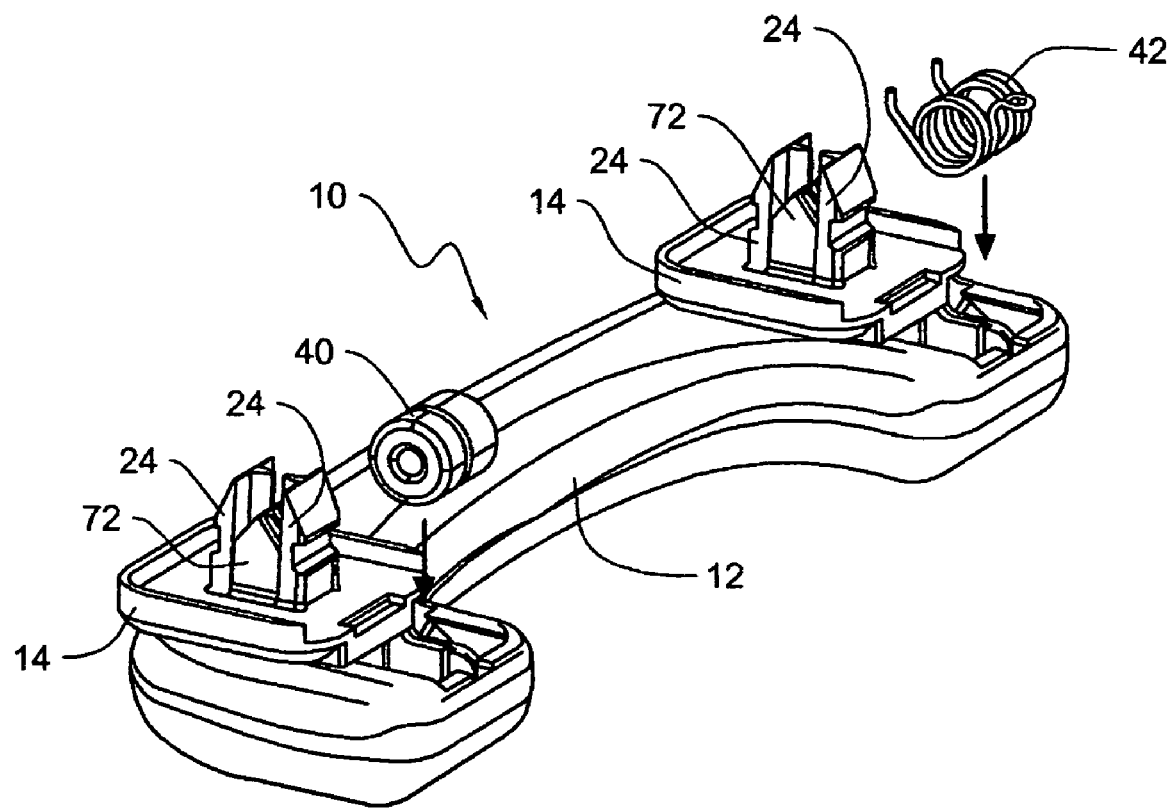
FIG. 8 is an isometric view of the mounting of the damper and spring to the handle assembly of the present invention.

Each hinge 14 also includes opposing mounting supports or legs 38 used to mount the handle 12 to the hinge 14. The mounting supports 38 are spaced apart to define a passageway through which is inserted and operatively mounted a damper 40 of the invention and a spring 42 (as shown in FIG. 8). The mounting supports 38 include outwardly extending bosses 44 that, in use, are snap-fit into the opposing holes 20 located within the aperture 18 in the handle 12. As indicated above, to assist in the mounting of the bosses 44 to the opposing holes 20, lead-ins or tracks 22 are provided to allow for easier insertion of the bosses 44 into the opposing holes 20.

The inner walls of the mounting supports 38 are configured and adapted to mount the damper 40 of the invention. In one exemplary embodiment shown in FIGS. 6 and 7, located on the inner wall of one of the mounting supports 38 is a mounting opening 46 (FIG. 7) for receiving one end of the damper 40. The mounting opening 46 may include an adjacent lead-in or track 48 to assist with the insertion of the end of the damper 40 to the mounting opening 46. On the inner wall of the opposing mounting support 38 is a channel or slot 50 (FIG. 6) for receiving the opposing end of the damper 40, as described below.

Figure 4:
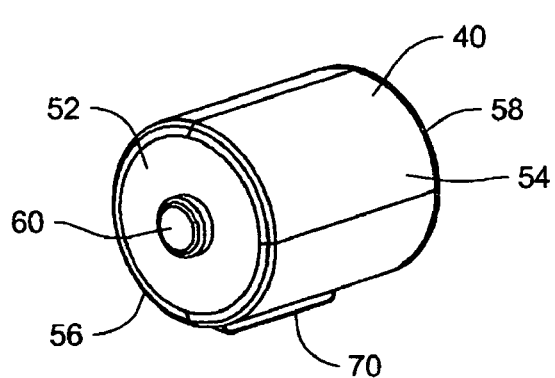
FIG. 4 is an isometric view of an exemplary damper of the present invention.
Figure 5:
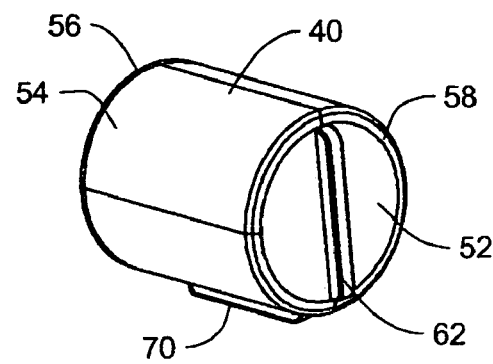
FIG. 5 is another isometric view of the damper of FIG. 4.

Referring to FIGS. 4 and 5, in an exemplary embodiment, the damper 40 of the invention includes a rotary body having a cylindrical configuration. The damper includes an inner rotary body 52 and an outer rotary body 54. Located within the damper body between the inner and outer rotary bodies is a known viscous fluid to provide the desired damping effect to control the return speed and force of the handle 12. The inner rotary body 52 of the damper 40 defines opposing ends 56, 58. The ends 56, 58 of the inner rotary body 52 define mounting members. In an exemplary embodiment, at end 56 the mounting member is a boss 60, and at the opposite end 58 the mounting member is a lip 62 that extends across the end 58. Unlike the known damper assemblies, there is no hole through the damper for a pivot pin. Because the damper 40 of the invention does not require a pivot pin, the volume of space within the damper 40 typically occupied by the pivot pin is used to contain additional damping fluid to provide more effective control of the rotational speed of the handle 12.

As illustrated in FIGS. 6 and 7, the boss 60 and lip 62 are adapted and configured for mating association with the hinge 14 and, specifically, for mating association with the mounting supports 38 of the hinge 14. That is, during installation, to mount the damper 40 to the hinge 14, the lip 62 is slid onto the channel or slot 50 in the mounting support 38, and the boss 60 is slid along the lead-in 48 and snap-fit into the mounting opening 46 in the opposing mounting support 38. The engagement of the lip 62 onto the channel or slot 50 serves to secure the damper relative to the hinge 14 and to prevent rotational movement of the inner rotary body 52 relative to the hinge 14.

Figure 9:
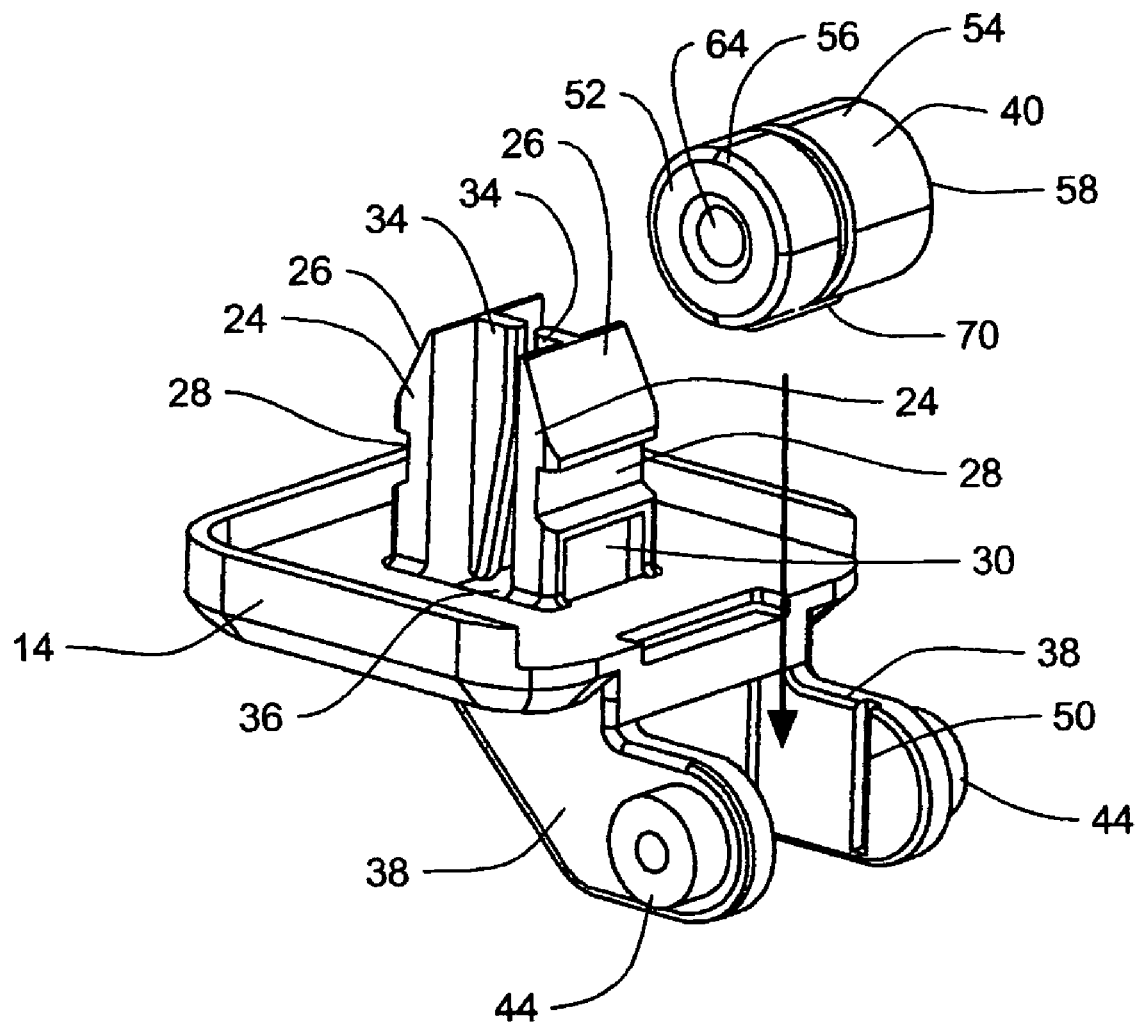
FIG. 9 is an isometric exploded view of another exemplary embodiment of the mounting components of the present invention.
Figure 10:
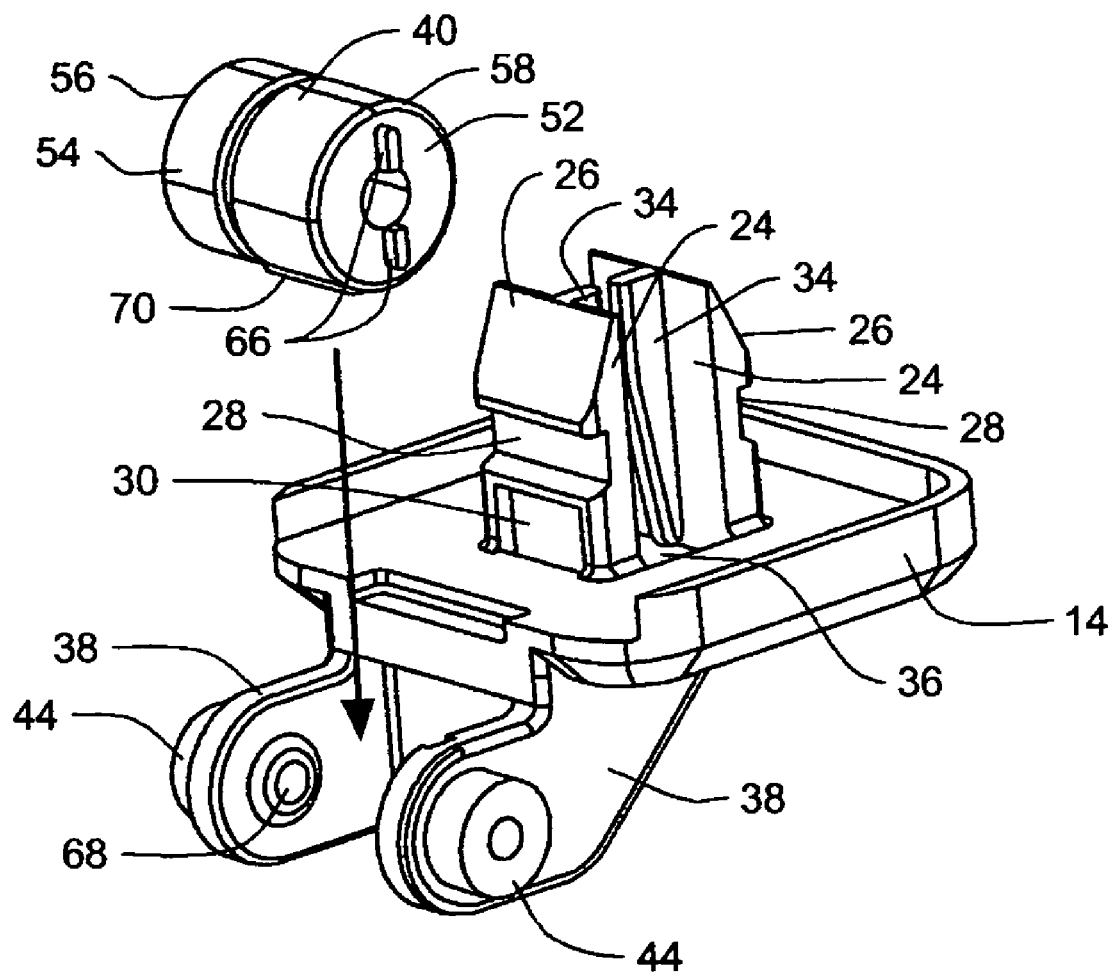
FIG. 10 is another isometric exploded view of the mounting components of FIG. 9.

As depicted in FIGS. 9 and 10, in another exemplary embodiment, the mounting members on the ends 56, 58 of the inner rotary body 52 of the damper 40 may include a recess 64 on end 56 and aligned lips 66 on end 58. The recess 64 is configured for mating engagement with a boss or rounded protuberance 68 (FIG. 10) on the inside surface of one of the mounting supports 38 while the aligned lips 66 are configured for mating engagement with the channel or slot 50 (FIG. 9) on the inside surface of the opposing mounting support 38. As will be readily apparent to those of skill in the art, the damper 40 may be configured with numerous combinations of mounting members all of which may be used to mount the damper 40 to the hinge 14.

Referring back to FIGS. 4 and 5, the outer rotary body 54 of the damper includes a body lip 70 extending outwardly from the body 54 of the damper 40. The body lip 70 is depicted as an elongated protrusion that extends longitudinally along the cylindrical body of the damper 40. As installed, the body lip 70 will mount to the handle 12 and will mate with a slot or channel formed within the aperture 18 and in the inner wall of the handle 12. In operation, as the handle 12 is moved, the body lip 70 on the damper 40 moves with the handle 12 by way of its connection to the handle 12. The outer rotary body 54 will rotate relative to the inner rotary body 52 and the damping fluid contained with the damper 40 will control the rotational speed of the handle 12, thereby providing the desired damping effect.

As exemplified by FIG. 8, a coiled spring 42 may be mounted to the mounting supports 38 of one of the hinges 14. As understood in the art, the coiled spring 42 may be mounted to the mounting supports using any known technique and the spring 42 will serve to bias the handle 12 in a desired direction. In the exemplary embodiment, the spring 42 will bias the handle 12 toward the stowed or closed position. It should be understood that other types of springs or biasing elements may be used to direct the handle 12 to the stowed position.

Referring to FIGS. 11–14, an opening 36 is formed between the mounting tabs 24 and is adapted to receive a lock pin 72 which may used to further secure the hinge 14 to the interior of the vehicle. The lock pin 72 defines a head 74 and a pin body 76. The lock pin body 76 further includes sets of protrusions 78 along opposing sides of the pin body 76 to provide a two-position assembly. In a first position, the lock pin 72 is pushed through the opening 36 and between the tabs 24 until the opening 36 is positioned between the first set of protrusions 78A. In this position, the hinge assembly is in a desired shipping position. In a second or installed position, the lock pin 72 is pushed through the opening 36 until the opening 36 is positioned beyond or past the second set of protrusions 78B and the pin head 74 contacts or is in close proximity to the hinge 14. In this installed position, the lock pin 72 will hold the hinge 14 more securely in place to the vehicle interior, as explained below.

Figure 11:
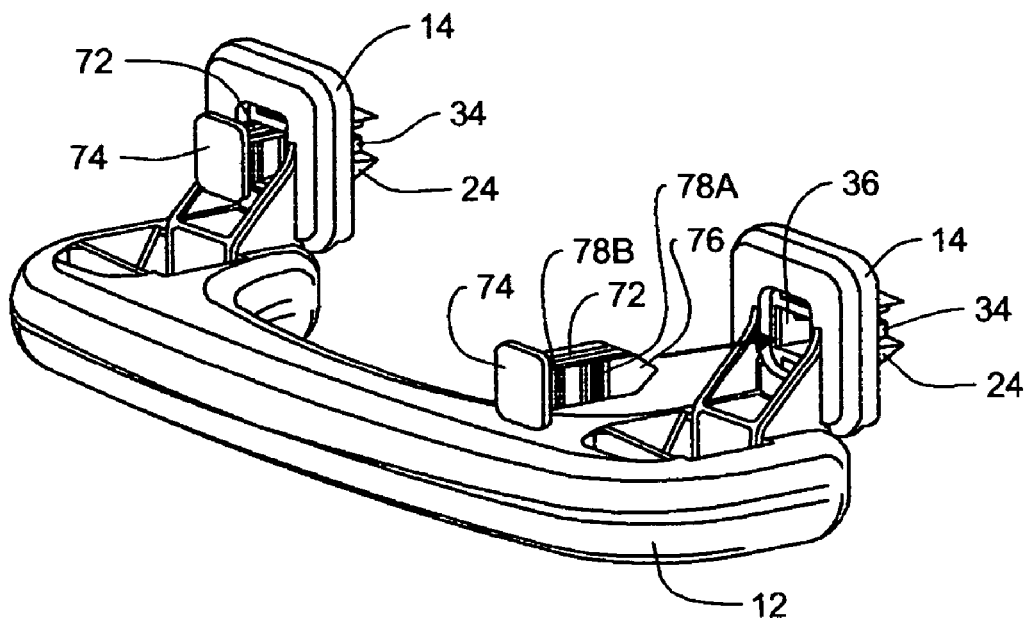
FIG. 11 is an isometric exploded view of the mounting of a lock pin to the handle assembly of FIG. 1.
Figure 12:
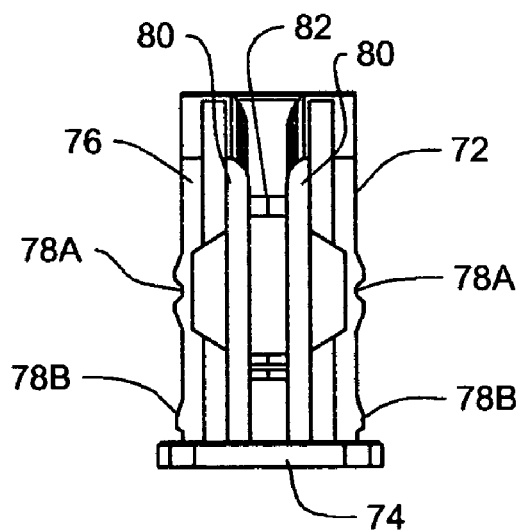
FIG. 12 is a top plan view of the lock pin of FIG. 11.

As illustrated by FIGS. 11–12, the lock pin body 76 also defines elongated guides 80 that serve to align the lock pin 72 with the ribs 34 on the tabs 24. Positioned between the guides 80 on opposing sides of the pin body 76 are inclined surfaces 82 that, in use, contact the ribs 34 during installation to cause the tabs 24 to spread apart as the lock pin 72 is inserted through the opening 36. That is, as the lock pin 72 is installed through the opening 36, the guides 80 will align the lock pin 72 and the ribs 34 on the tabs 24 will pass between the guides 80. As the lock pin 72 is further inserted through the opening 36, the inclined surfaces 82 will contact the ribs 34 forcing the ribs 34 and tabs 24 to spread apart. The spread-apart tabs 24 will further secure the hinge 14 to the mating opening formed in the vehicle or other structure. One skilled in the art will understand and appreciate that other techniques for mounting the hinge 14 to the vehicle interior are possible with the present invention.

Figure 13:
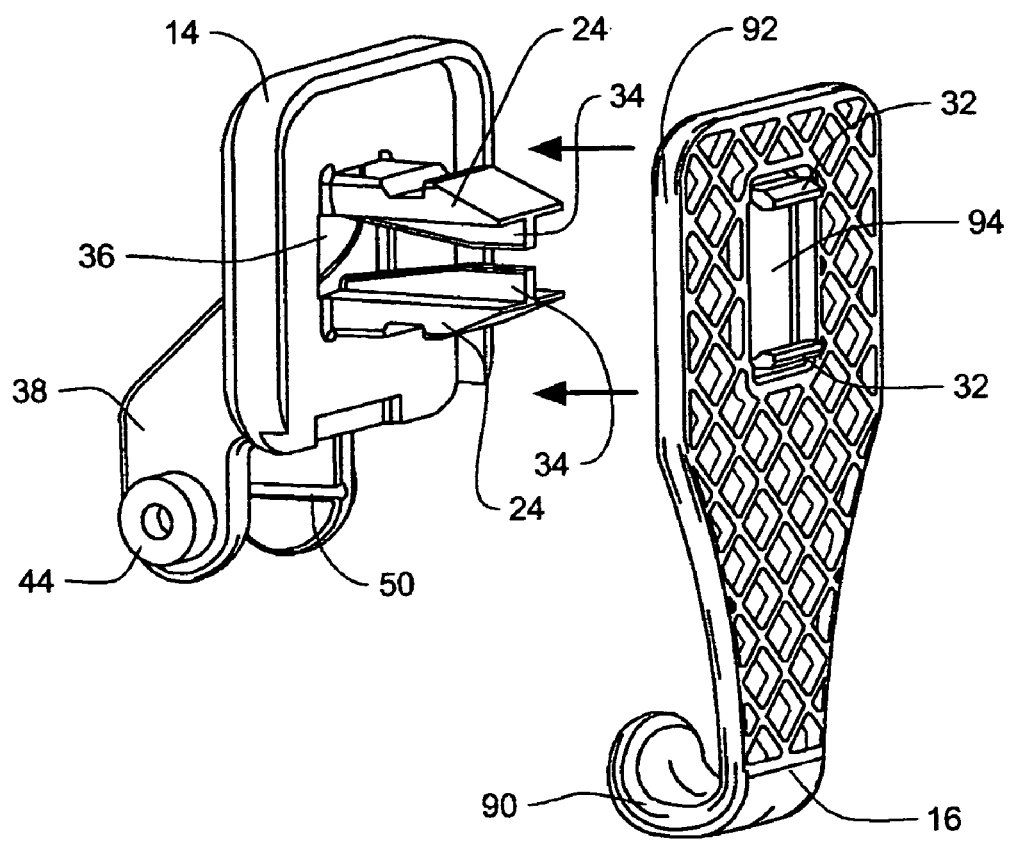
FIG. 13 is an isometric exploded view of the mounting of an exemplary coat hook to the hinge of the present invention.
Figure 14:
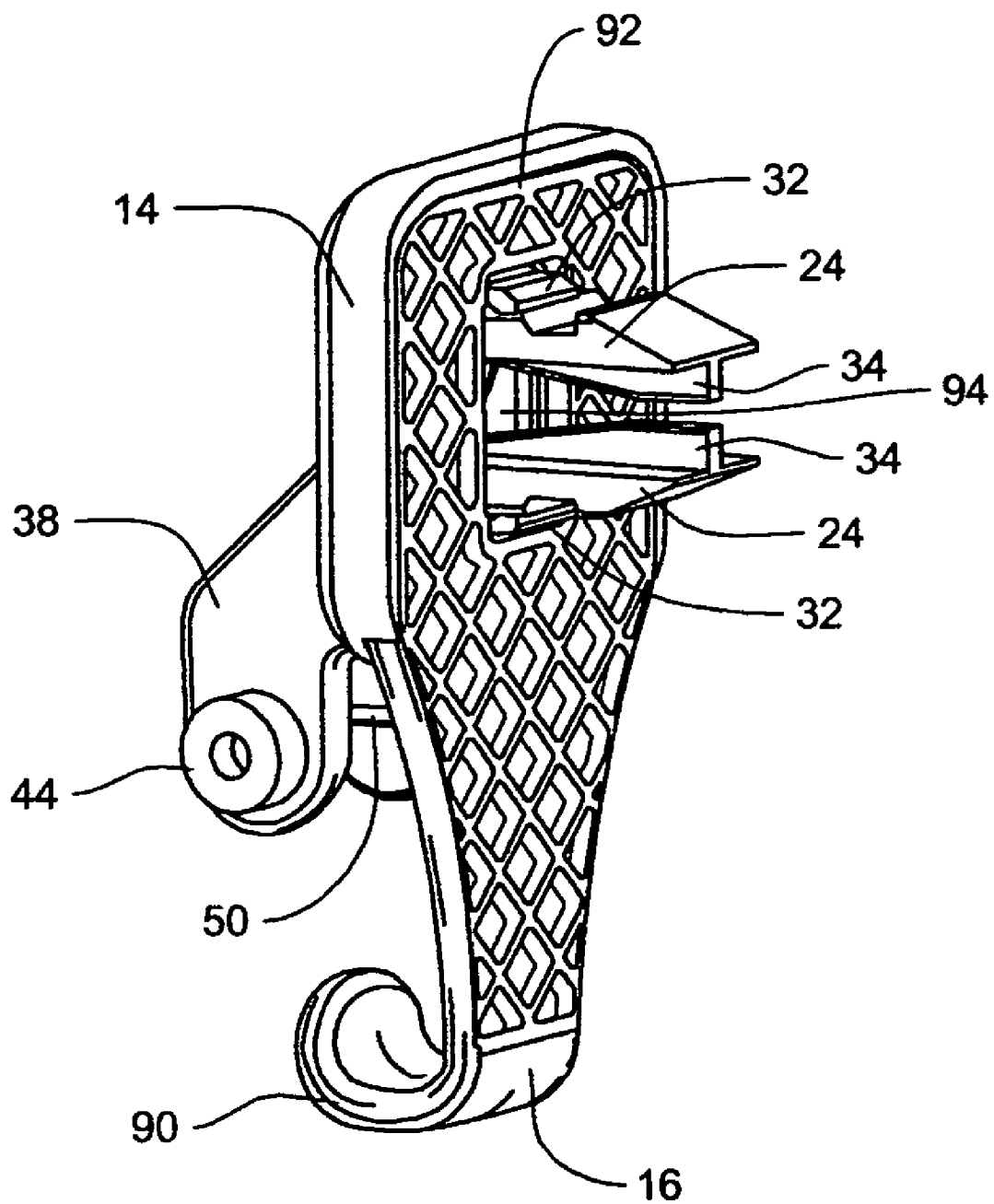
FIG. 14 is an isometric view of the coat hook of FIG. 13 mounted to the hinge of the present invention.

As depicted in FIGS. 13–14, a coat hook 16 may be mounted to and positioned between the hinge 14 and the vehicle interior. The depicted coat hook 16 defines a body having at one end a hook 90 for hanging articles of clothing and the like and, at the other end, a relatively flat portion 92 forming an opening 94 through which is mounted the tabs 24. Positioned adjacent to the opening 94 on the back wall of the coat hook are a pair of opposing tabs 32 that will contact the recessed portions 30 of the tabs 24 to assist in holding the hinge 14 and coat hook 16 together. In an exemplary embodiment, as assembled, the tabs 32 will contact and engage the recessed portions 30 of the flexible tabs 24 and will snap-fit within the recessed portions 30 to assist in securing the hook 16 to the hinge 14. One skilled in the art will understand that other configurations of the coat hook and tabs are possible to secure the coat hook to the hinge.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A handle assembly for use in a vehicle comprising:
    a handle defining opposing handle ends, each end including a lead-in channel and a mounting hole, each lead-in channel having an open end and a track that tapers in width from the open end to the mounting hole, such that the width of the track is greatest at the open end and narrowest at the mounting hole,
    a hinge operatively mounted to each of the opposing handle ends, the hinge including a pair of bosses, each adapted and configured to be received by the associated lead-in channel, open end, track and mounting hole of the handle in such a manner that the bosses slide along the associated track of the lead-in channel to the mounting hole so that the hinge is snap-fit to the handle, the hinge defining mounting supports and mounting tabs, the mounting tabs are snap-fit to the vehicle, and
    a damper operatively mounted to the mounting supports of at least one of the hinges, the damper including an inner rotary body and an outer rotary body, the inner rotary body defining a first end and a first mounting member, the inner rotary body also defining a second end and a second mounting member, the first and second mounting members coupling the inner rotary body to the mounting supports, the outer rotary body defining a third mounting member that is coupled to the handle.

2. The handle assembly as set forth in claim 1, wherein the mounting members are selected from the group of a boss, protrusion, protuberance, and lip.

3. The handle assembly as set forth in claim 1, further comprising a spring operatively mounted to the mounting supports.

4. The handle assembly as set forth in claim 1, further comprising a book mounted to the mounting tabs of the binge, the book defining an opening for receiving the mounting tabs and opposing tabs for securing the hook to the mounting tabs.

5. The handle assembly as set forth in claim 1, further comprising a lock pin mounted to the mounting tabs and slidable within an opening formed between the mounting tabs, the lock pin defining elongated guides and include surfaces that engage the mounting tabs.

6. A handle assembly for use in a vehicle comprising:
    a handle defining opposing handle ends, each end including a lead-in channel and a mounting hole, each lead-in channel having an open end and a track that tapers in width from the open and to the mounting hole, such that the width of the track is greatest at the open end and narrowest at the mounting hole,
    a hinge operatively mounted to each of the opposing handle ends, the hinge including a pair of bosses, each adapted and configured to be received by the associated lead-in channel, open end, track and mounting hole of the handle in such a that the bosses slide along the associated track of the lead-in channel to the mounting hole so that the hinge is snap-fit to the handle, the hinge further including mounting tabs and mounting supports, and a damper operatively mounted to the mounting supports of at least one of the hinges, the damper including an inner rotary body and an outer rotary body, the inner rotary body defining a first end and a first mounting member, the inner rotary body also defining a second end and a second mounted member, the first and second mounted members coupling the inner rotary body to the mounting supports, the outer rotary body defining a third mounting member that is coupled to the handle.

7. The handle assembly as set forth in claim 6, wherein the mounting member are selected from the group consisting of a boss, protuberance, and lip.

8. The handle assembly as set forth in claim 6, further comprising a spring operatively mounted to the mounting supports.

9. The handle assembly as set forth in claim 6, wherein the mounting tabs include a tapered end and a inclined rib.

10. The handle assembly as set forth in claim 6, wherein the hinge includes an opening between the mounting tabs.

11. The handle assembly set forth in claim 10, further comprising a hook mounted to the mounting tabs of the hinge.

12. The handle assembly as set forth in claim 10, further comprising a lock pin mounted through the opening, the lock pin defining protrusion for securing the lock pin to the hinge.

13. A handle assembly for use in a vehicle comprising:
a handle defining opposing handle ends and apertures within the handle ends, each of the handle ends including opposing mounting holes, each aperture narrowing in width from a first end to a second end,
at least one hinge positioned within each of the apertures so as to be slidably received thereby, the at least one hinge defining first and second mounting support, each mounting including an outwardly extending boss each boss extending in opposite direction from one another with respect to the associated mounting support, such that the outwardly extending bosses are snap-fit into the opposing mounting holes within the handle ends, each mounting support further including one of a mounting support projecting member and a mounting support recess, and the at least one hinge further defining mounting tabs, the mounting tabs are snap-fit to the vehicle,
a damper operatively mounted to the first and second mounting supports of at least one of the hinges, the damper including an inner rotary body and an outer rotary body, the inner rotary body defining a first end and a first mounting member being either a first damper projecting member adapted for coupling attachment to the associated mounting support recess, and a first damper recess adapted for coupling attachment to the associated mounting support projecting member, the inner rotary body also defining a second end and a second mounting member being either a second damper projecting member adapted for coupling attachment to the associated mounting support recess, and a second damper recess adapted for coupling attachment to the associated mounting support projecting member, the outer rotary body defining a third mounting member that is coupled to the handle, and
a spring operatively mounted to the mounting supports of at least one of the hinges.

14. The handle assembly as set forth in claim 13, wherein the projecting mounting members of the damper are selected from the group consisting of a boss, protrusion, protuberance, and lip.

15. The handle assembly as set fort in claim 13, further comprising a hook mounted to the mounting tabs of the hinge, the hook defining an opening for receiving the mounting tabs and opposing tabs for securing the hook to the mounting tabs.

16. The handle assembly as set forth in claim 13, further comprising a lock pin mounted to the mounting tabs and slidable within an opening formed between the mounting tabs, the lock pin defining elongated guides and inclined surfaces that engage inclined ribs formed on the mounting tabs.

* * * * *